US010869302B2

(12) United States Patent
Chen et al.

(10) Patent No.: US 10,869,302 B2
(45) Date of Patent: Dec. 15, 2020

(54) TECHNIQUES FOR DOWNLINK ASSIGNMENT INDEX (DAI) MANAGEMENT IN CARRIER AGGREGATION

(71) Applicant: QUALCOMM Incorporated, San Diego, CA (US)

(72) Inventors: Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/350,988

(22) Filed: Nov. 14, 2016

(65) Prior Publication Data
US 2017/0142695 A1     May 18, 2017

Related U.S. Application Data

(60) Provisional application No. 62/255,890, filed on Nov. 16, 2015.

(51) Int. Cl.
*H04W 72/04* (2009.01)
*H04L 5/00* (2006.01)
*H04L 5/14* (2006.01)

(52) U.S. Cl.
CPC ........... *H04W 72/042* (2013.01); *H04L 5/001* (2013.01); *H04L 5/0016* (2013.01);
(Continued)

(58) Field of Classification Search
CPC .... H04W 72/042; H04L 5/001; H04L 5/0016; H04L 5/0055
See application file for complete search history.

(56) References Cited

U.S. PATENT DOCUMENTS 9,705,653 B2   7/2017  Chen et al.
2009/0129317 A1*  5/2009  Che .................. H04L 1/1614
                                                    370/328
(Continued)

FOREIGN PATENT DOCUMENTS

CN      102237980 A      11/2011
CN      104285468 A       1/2015
WO      2010129606 A1    11/2010

OTHER PUBLICATIONS

Intel Corporation., "Views on UL Control Enhancements for CA Operation", 3GPP Draft, R1-150237, 3rd Generation Partnership Project (3GPP), Mobile Competence Centre, 650, Route Des Lucioles, F-06921 Sophia-Antipolis Cedex, France, vol. RAN WG1, no. Athens, Greece, 20150209-20150213, Feb. 8, 2015 (Feb. 8, 2015), XP050933450, 4 pages. Retrieved from the Internet: URL:http://www.3gpp.org/ftp/Meetings_3GPP_SYNC/RAN1/Docs/.
(Continued)

*Primary Examiner* — Jael M Ulysse
(74) *Attorney, Agent, or Firm* — Arent Fox LLP

(57) ABSTRACT

The present disclosure describes various aspects related to techniques for downlink assignment index (DAI) management in carrier aggregation. In one aspect, a method is provided in which a user equipment receives a DAI indicating a total number of DL assignments or codewords. This method may further include interpreting the DAI received from the base station based at least on whether the DAI is received from the base station in a DL grant or a uplink (UL) grant. In another aspect, a method is provided in which a base station determines whether to transmit a DAI in a DL grant or a uplink (UL) grant, and transmits the DAI in the DL grant or the UL grant to one or more user equipments (UEs) based on the determination.

25 Claims, 9 Drawing Sheets

(52) U.S. Cl.
CPC .......... *H04L 5/0053* (2013.01); *H04L 5/0055* (2013.01); *H04L 5/14* (2013.01); *H04W 72/0413* (2013.01); *H04L 5/0091* (2013.01)

(56) References Cited

U.S. PATENT DOCUMENTS

| | | | | |
|---|---|---|---|---|
| 2009/0323617 A1* | 12/2009 | Che | .................. | H04L 1/1635 370/329 |
| 2010/0271970 A1* | 10/2010 | Pan | .................. | H04L 1/0026 370/252 |
| 2011/0064042 A1* | 3/2011 | Kim | .................. | H04L 5/0094 370/329 |
| 2011/0128922 A1* | 6/2011 | Chen | .................. | H04L 5/0007 370/329 |
| 2011/0243106 A1* | 10/2011 | Hsu | .................. | H04W 72/1284 370/336 |
| 2011/0280164 A1* | 11/2011 | Luo | .................. | H04L 5/0053 370/281 |
| 2012/0039279 A1* | 2/2012 | Chen | .................. | H04W 72/1284 370/329 |
| 2012/0195292 A1* | 8/2012 | Ko | .................. | H04L 1/0027 370/336 |
| 2012/0314637 A1* | 12/2012 | Kim | .................. | H04L 1/1851 370/311 |
| 2012/0314674 A1* | 12/2012 | Seo | .................. | H04L 1/1861 370/329 |
| 2012/0320805 A1* | 12/2012 | Yang | .................. | H04L 1/1861 370/280 |
| 2012/0320840 A1* | 12/2012 | Kim | .................. | H04L 5/001 370/329 |
| 2012/0327883 A1* | 12/2012 | Yang | .................. | H04L 1/0026 370/329 |
| 2013/0223299 A1* | 8/2013 | Yang | .................. | H04L 1/1812 370/280 |
| 2013/0258914 A1* | 10/2013 | Seo | .................. | H04L 1/1896 370/280 |
| 2013/0336160 A1* | 12/2013 | Yin | .................. | H04L 1/1854 370/254 |
| 2014/0036814 A1* | 2/2014 | Zhang | .................. | H04L 5/003 370/329 |
| 2014/0050130 A1* | 2/2014 | Kim | .................. | H04L 5/001 370/280 |
| 2014/0071932 A1* | 3/2014 | Fu | .................. | H04L 1/1854 370/329 |
| 2014/0328292 A1* | 11/2014 | Yang | .................. | H04W 72/042 370/329 |
| 2015/0003353 A1* | 1/2015 | Yang | .................. | H04L 1/1861 370/329 |
| 2015/0049653 A1* | 2/2015 | Baghel | .................. | H04L 1/1861 370/280 |
| 2015/0200751 A1* | 7/2015 | Yin | .................. | H04L 1/1887 370/280 |
| 2015/0236824 A1* | 8/2015 | Lei | .................. | H04W 72/12 370/280 |
| 2015/0249975 A1* | 9/2015 | Yang | .................. | H04L 1/1812 370/329 |
| 2015/0280883 A1* | 10/2015 | Seo | .................. | H04W 72/0413 370/329 |

OTHER PUBLICATIONS

International Search Report and Written Opinion—PCT/US2016/061975—ISA/EPO—dated Feb. 22, 2017. (11 total pages).

LG Electronics: "HARQ-ACK Payload Adaptation for Rel-13 CA", 3GPP Draft, R1-156850, ECA an Adaptation Final, 3rd Generation Partnership Project (3GPP), Mobile Competence Centre, 650, Route Des Lucioles, F-06921, Sophia-Antipolis Antipolis Cedex, France , vol. RAN WG1, no. Anaheim, USA, 20151115-20151122, Nov. 15, 2015 (Nov. 15, 2015), XP051003206, 10 pages. Retrieved from the Internet: URL:http://www.3gpp.org/ftp/Meetings3GPPSYNC/RAN1/Docs/.

Huawei, et al., "UCI on PUSCH for Carrier Aggregation Enhancement Beyond 5 Carriers", 3GPP TSG RAN WG1 Meeting #82, R1-154337, Beijing, China, Aug. 24-28, 2015 (Aug. 15, 2015), 2 Pages, Aug. 15, 2015, http://www.3gpp.org/ftp/tsg_ran/WG1_RL1/TSGR1_82/Docs.

* cited by examiner

TECHNIQUES FOR DOWNLINK ASSIGNMENT INDEX (DAI) MANAGEMENT IN CARRIER AGGREGATION

CLAIM OF PRIORITY

The present application for patent claims priority to U.S. Provisional Patent Application No. 62/255,890, filed Nov. 16, 2015, entitled "Techniques for Downlink Assignment Index (DAI) Management in Carrier Aggregation," which is assigned to the assignee hereof, and hereby expressly incorporated by reference herein.

BACKGROUND

Aspects of this disclosure relate generally to telecommunications, and more particularly to techniques for downlink assignment index (DAI) management in carrier aggregation.

Wireless communications networks are widely deployed to provide various communication services such as voice, video, packet data, messaging, broadcast, and the like. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations (e.g., eNodeBs or eNBs) that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

In some wireless communication networks, such as in Long Term Evolution (LTE), for example, a downlink assignment index (DAI) may be communicated by an eNB to an UE to prevent acknowledgment/negative-acknowledgment (ACK/NACK) errors that may occur as part of Hybrid Automatic Repeat Request (HARQ) operations in which the UE bundles ACK/NACK feedback to the eNB. The use of the DAI in systems in which multiple component carriers (CCs) are supported for carrier aggregation may present some challenges, particularly as the number of component carriers that are supported increases. Accordingly, it is desirable to have mechanisms that enable the use of a DAI in a wide range of carrier aggregation scenarios.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to one example, a method for downlink (DL) assignment index (DAI) management in an enhanced carrier aggregation (eCA) is provided. The example method may include receiving, at a user equipment (UE) and from a base station, a DAI indicating a total number of DL assignments or codewords; and interpreting, at the UE, the DAI received from the base station based at least on whether the DAI is received from the base station in a DL grant or a uplink (UL) grant.

In another example, an apparatus for downlink (DL) assignment index (DAI) management in an enhanced carrier aggregation (eCA) is provided. The example apparatus may include means for receiving, at a user equipment (UE) and from a base station, a DAI indicating a total number of DL assignments or codewords; and means for interpreting, at the UE, the DAI received from the base station based at least on whether the DAI is received from the base station in a DL grant or a uplink (UL) grant.

In a further example, an apparatus for downlink (DL) assignment index (DAI) management in an enhanced carrier aggregation (eCA) is provided that may include a memory configured to store data; and one or more processors communicatively coupled with the memory, wherein the one or more processors and the memory are configured to receive, at a user equipment (UE) and from a base station, a DAI indicating a total number of DL assignments or codewords; and interpret, at the UE, the DAI received from the base station based at least on whether the DAI is received from the base station in a DL grant or a uplink (UL) grant.

Additionally, in another example, a computer readable medium storing computer executable code for downlink (DL) assignment index (DAI) management in an enhanced carrier aggregation (eCA) is provided. The computer readable medium includes code for receiving, at a user equipment (UE) and from a base station, a DAI indicating a total number of DL assignments or codewords; and code for interpreting, at the UE, the DAI received from the base station based at least on whether the DAI is received from the base station in a DL grant or a uplink (UL) grant.

According to another example, a method for downlink (DL) assignment index (DAI) management in an enhanced carrier aggregation (eCA) is provided. The example method includes determining, at a base station, whether to transmit a DAI in a DL grant or a uplink (UL) grant, wherein the DAI indicates a total number of DL assignments or codewords; and transmitting, from the base station, the DAI in the DL grant or the UL grant to one or more user equipments (UEs) based on the determination.

In another example, an apparatus for downlink (DL) assignment index (DAI) management in an enhanced carrier aggregation (eCA) is provided. The example apparatus may include means for determining, at a base station, whether to transmit a DAI in a DL grant or a uplink (UL) grant, wherein the DAI indicates a total number of DL assignments or codewords; and means for transmitting, from the base station, the DAI in the DL grant or the UL grant to one or more user equipments (UEs) based on the determination.

In a further example, an apparatus for downlink (DL) assignment index (DAI) management in an enhanced carrier aggregation (eCA) is provided that may include a memory configured to store data; and one or more processors communicatively coupled with the memory, wherein the one or more processors and the memory are configured to determine, at a base station, whether to transmit a DAI in a DL grant or a uplink (UL) grant, wherein the DAI indicates a total number of DL assignments or codewords; and transmit, from the base station, the DAI in the DL grant or the UL grant to one or more user equipments (UEs) based on the determination.

Additionally, in another example, a computer readable medium storing computer executable code for downlink (DL) assignment index (DAI) management in an enhanced carrier aggregation (eCA) is provided that may include code for determining, at a base station, whether to transmit a DAI in a DL grant or a uplink (UL) grant, wherein the DAI indicates a total number of DL assignments or codewords; and code for transmitting, from the base station, the DAI in the DL grant or the UL grant to one or more user equipments (UEs) based on the determination.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout, where dashed lines may indicate optional components or actions, and wherein.

DETAILED DESCRIPTION

Figure 1:
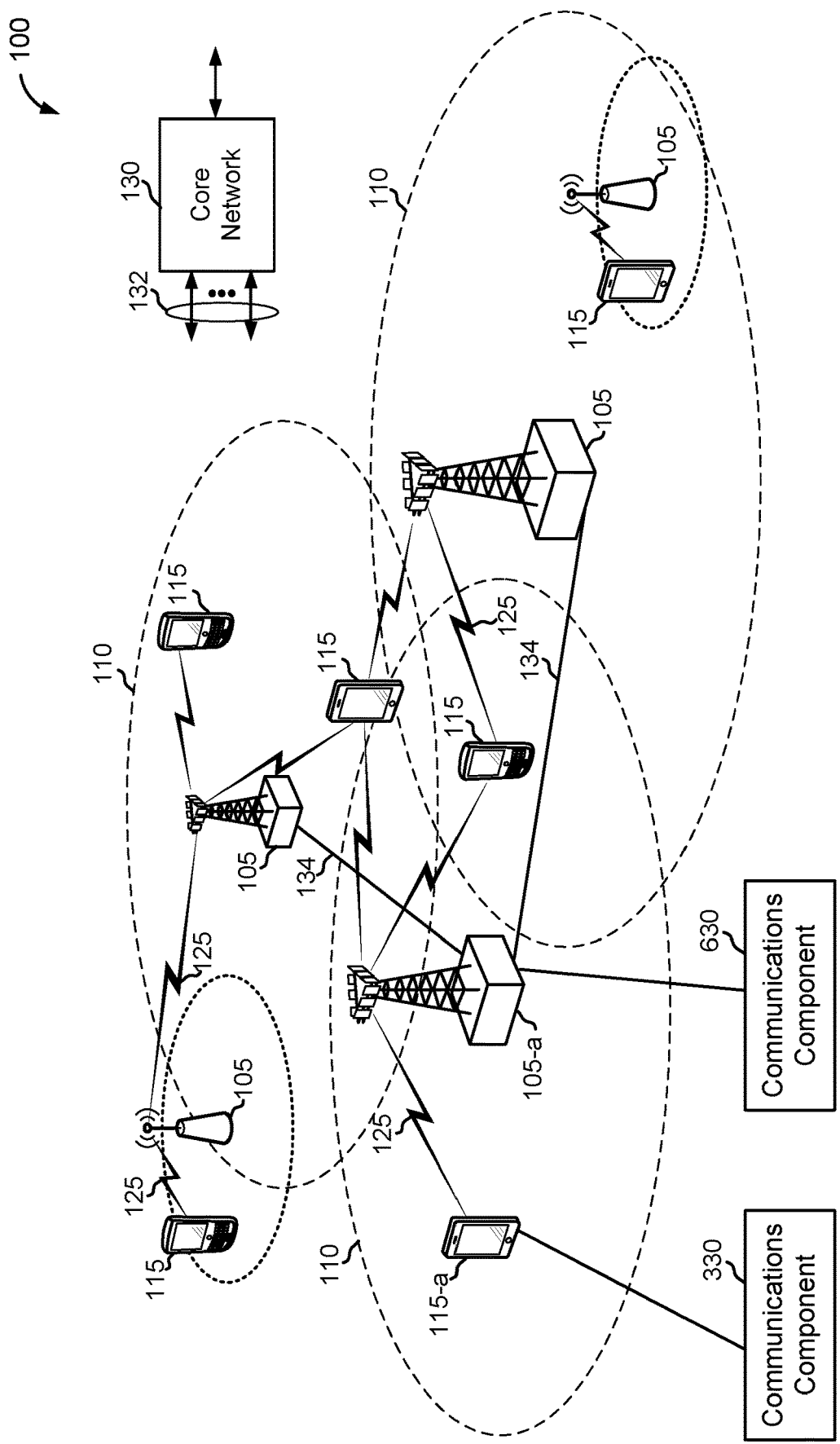
FIG. 1 is a schematic diagram conceptually illustrating an example of a wireless communications system, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

The present aspects generally relate to downlink assignment index (DAI) management in carrier aggregation (CA), and particularly in carrier aggregation scenarios in which larger numbers of component carriers (CCs) or cells are being supported (e.g., enhanced carrier aggregation or eCA). Throughout this disclosure the terms component carriers and cells may be used interchangeably. In some implementations (e.g., in LTE Rel-12), a UE may be configured to support up to five (5) component carriers (CC) for carrier aggregation. For example, each component carrier may be configured with up to 20 MHz and may be backward compatible (the UE may therefore be configured to support up to 100 MHz). In carrier aggregation, all the component carriers—which may sometimes be referred to as cells—may operate in frequency division duplexing (FDD) or time division duplexing (TDD), or operate in a combination or mixture of FDD and TDD. In some instances, component carriers in TDD may have the same or different downlink (DL) and uplink (UL) configurations. In addition, special subframes may also be configured differently for different TDD component carriers.

In another aspect related to current implementations, one component carrier may be configured as the primary component carrier (PCC) for the UE. The PCC is the only component carrier that is configured to carry a Physical Uplink Control Channel (PUCCH) and a common search space for the UE. All other or remaining component carriers are termed secondary component carriers (SCCs). In these implementations, no adoption has been made of enabling PUCCH for a UE on two component carriers for carrier aggregation. In such a scheme, besides the PCC, one of the secondary component carriers or cell may carry PUCCH as well. This approach is at least partially motivated by dual-connectivity and PUCCH load balancing needs.

In some cases, component carriers may not have ideal backhaul capabilities, and consequently, very tight coordination between the various component carriers may not be possible because of the limited backhaul capacity and non-negligible backhaul latency (e.g., tens of milliseconds). The concept of dual-connectivity was therefore introduced recently (e.g., LTE Rel-12) to address the above scenario. In dual-connectivity, component carriers or cells may be partitioned into two groups, the primary cell group (PCG) and the secondary cell group (SCG). Each of these groups may have one or more cells in carrier aggregation. In addition, each of these groups may have a single cell carrying PUCCH. For example, a primary cell in PCG carries PUCCH for the PCG, and a secondary cell in SCG carries PUCCH for the SCG, also called the pScell. The common search space is also additionally monitored in the SCG by the UE. Uplink control information (UCI) may be separately conveyed to each group via the PUCCH in each group. Moreover, semi-static scheduling (SPS) and scheduling requests (SR) are not only supported in the PSG but are supported in the SCG as well.

In current efforts (e.g., LTE Rel-13), there is a push to increase the number of component carriers beyond five (5) component carriers to enable enhanced carrier aggregation (eCA). For example, PUCCH on a secondary cell (SCell) for UEs supporting uplink carrier aggregation may now be possible. In addition, the physical layer Specifications for PUCCH on SCell may be developed based on the necessary mechanisms that would enable LTE carrier aggregation of up to 32 component carriers for the downlink and uplink. Such mechanisms may include enhancements to downlink control signalling for up to 32 component carriers including both self-scheduling and cross-carrier scheduling, if any, as well as enhancements to uplink control signalling for up to 32 component carriers. The enhancements to uplink control signalling may involve enhancements to support UCI feedback on PUCCH for up to 32 downlink carriers by specifying the necessary enhancements to UCI feedback signalling formats, as well as enhancements to support UCI feedback on Physical Uplink Shared Channel (PUSCH) for up to 32 downlink carriers.

These efforts to increase the number of component carriers need also take into consideration the use of downlink assignment index (DAI) for HARQ feedback. In TDD, for example, multiple downlink (DL) subframes may be associated with a same uplink (UL) subframe for HARQ feedback. In order to more efficiently provide ACK/NACK feedback, a 2-bit DAI may be included in DL grants and UL grants in TDD. When included in the DL grant, the 2-bit DL DAI may indicate the accumulative number of DL assignments. When included in the UL grant, the 2-bit UL DAI may indicate the total number of DL assignments. A UE may, based on the indicated total DAI, determine the number of ACK/NACK bits for feedback, and based on the indicated accumulative DAI, order the ACK/NACK bits of different DL subframes associated with the same UL subframe.

In TDD with carrier aggregation, the UL DAI may be used to indicate a maximum number of DL subframes scheduled in any of the multiple component carriers being supported. For example, when 2 component carriers are being used (i.e., CC1 and CC2), with DL CC1 and DL CC2 both having 4 DL subframes associated with the same UL subframe, and when only 3 of the DL subframes in CC1 are scheduled and only 2 of the DL subframes in CC2 are scheduled, the total DAI may indicate a value of 3, representing the maximum number of scheduled DL subframes in each of the two component carriers.

For FDD, however, there may not be DAI involved, even under FDD with carrier aggregation. The use of DAI in FDD with carrier aggregation may be beneficial because, for example, instead of counting the number of DL assignments in time domain as in TDD, DAI in FDD may count in the component carrier-domain (e.g., frequency-domain) reflecting the number of component carriers or codewords that are scheduled.

For both FDD and TDD with carrier aggregation, when a TDD component carrier is used to carry PUCCH (thus the TDD component carrier is the primary cell, or the primary secondary cell), DAI may be added for DL grants and UL grants for the FDD component carrier (as a secondary cell). In other words, the FDD Scell Downlink Control Information (DCI) formats may be adapted to the TDD-like DCI formats when TDD is the primary cell or the primary secondary cell. Similarly, a TDD Scell Downlink Control Information (DCI) formats may be adapted to the FDD-like DCI formats when FDD is the primary cell or the primary secondary cell.

For enhanced carrier aggregation, because of the increased number of component carriers, DAI is to be used in both FDD and TDD component carriers, even if a UE has all FDD component carriers or when a FDD cell is the primary cell or the primary secondary cell. The manner in which DAI is to be defined for enhanced carrier aggregation has yet to be defined. Accordingly, aspects of the present disclosure provide details of various techniques or schemes for using or managing the use of DAI in enhanced carrier aggregation. Some of these aspects address issues such as the introduction of total DAI in DL grants even when accumulative DAI, which is counted in a frequency(CC)-first, time-second manner, is used. Other issues may include the number of bits for DAI in DL grants. In one example, for accumulative DAI, instead of 2-bits it may be possible to use 3 bits, 4 bits, or 5 bits, or have the number of bits depend on the number of configured component carriers (e.g., 6-16 CCs, 3 bits, >16 CCs, 4 bits). In another example, for total DAI, the number of bits may be 2 bits or 3 bits. Another issue being addressed by the various aspects described herein is the introduction of DAI in UL grants under FDD carrier aggregation even in cases when total DAI is already introduced in DL grants.

The techniques described herein may be used for the wireless networks and radio technologies mentioned above as well as other wireless networks and radio technologies. For clarity, certain aspects of the techniques are described below for LTE, and LTE terminology is used in much of the description below.

FIG. 1 is a schematic diagram conceptually illustrating an example of a wireless communications system 100, in accordance with an aspect of the present disclosure. The wireless communications system 100 includes base stations (or cells) 105, user equipment (UEs) 115, and a core network 130. One or more base stations 105 may include a communications component 630 (see FIG. 6) for DAI management in enhanced carrier aggregation (eCA) at network device, as described herein. One or more UEs 115 may include a communications component 330 (see FIG. 3) for DAI management in eCA, as described herein. The base stations 105 may communicate with the UEs 115 under the control of a base station controller (not shown), which may be part of the core network 130 or the base stations 105 in various embodiments. The base stations 105 may communicate control information and/or user data with the core network 130 through first backhaul links 132. In embodiments, the base stations 105 may communicate, either directly or indirectly, with each other over second backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc. The wireless communications system 100 may also support operation on multiple flows at the same time. In some aspects, the multiple flows may correspond to multiple wireless wide area networks (WWANs) or cellular flows. In other aspects, the multiple flows may correspond to a combination of WWANs or cellular flows and wireless local area networks (WLANs) or Wi-Fi flows.

The base stations 105 may wirelessly communicate with the UEs 115 via one or more base station antennas. Each of the base stations 105 sites may provide communication coverage for a respective geographic coverage area 110. In some embodiments, base stations 105 may be referred to as a base transceiver station, a radio base station, an access point, a radio transceiver, a basic service set (BSS), an extended service set (ESS), a NodeB, eNodeB, eNB, Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro, micro, and/or pico base stations). There may be overlapping coverage areas for different technologies. In general, base stations 105-a may be base stations corresponding to a WWAN (e.g., LTE or UMTS macro cell, pico cell, femto cell, etc. base stations). It is to be appreciated, however, that a single base station 105 can support communications over multiple RATs (e.g., LTE and Wi-Fi, LTE and UMTS, UMTS and Wi-Fi, etc.).

In implementations, the wireless communications system 100 is an LTE/LTE-A network communication system. In LTE/LTE-A network communication systems, the terms evolved Node B (eNodeB or eNB) may be generally used to describe the base stations 105. The wireless communications system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell may cover a relatively large geographic area (e.g., several kilometers in radius) and may allow unrestricted access by UEs 115 with service subscriptions with the network provider. A pico cell may cover a relatively smaller geographic area (e.g., buildings) and may allow unrestricted access by UEs 115 with service subscriptions with the network provider. A femto cell may also cover a relatively small geographic area (e.g., a home) and, in addition to unrestricted access, may also provide restricted access by UEs 115 having an association with the femto cell (e.g., UEs 115 in a closed subscriber group (CSG), UEs 115 for users in the home, and the like). An eNB 105 for a macro cell may be referred to as a macro eNodeB. An eNB 105 for a pico cell may be referred to as a pico eNodeB. And, an eNB 105 for a femto cell may be referred to as a femto eNodeB or a home eNodeB. An eNB 105 may support one or multiple (e.g., two, three, four, and the like) cells.

The core network 130 may communicate with the eNBs 105 or other base stations 105 via first backhaul links 132 (e.g., S1 interface, etc.). The eNBs 105 may also communicate with one another, e.g., directly or indirectly via second backhaul links 134 (e.g., X2 interface, etc.) and/or via the first backhaul links 132 (e.g., through core network 130). The wireless communications system 100 may support synchronous or asynchronous operation. For synchronous operation, the eNBs 105 may have similar frame timing, and transmissions from different eNBs 105 may be approximately aligned in time. For asynchronous operation, the eNBs 105 may have different frame timing, and transmissions from different eNBs 105 may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with macro eNBs, eNodeBs, pico eNodeBs, femto eNodeBs, relays, and the like.

The communication links 125 shown in the wireless communications system 100 may include uplink (UL) transmissions from a UE 115 to an eNB 105, and/or downlink (DL) transmissions, from an eNB 105 to a UE 115. The downlink transmissions may also be called forward link transmissions while the uplink transmissions may also be called reverse link transmissions.

In certain aspects of the wireless communications system 100, a UE 115 may be configured to support carrier aggregation (CA) with two or more eNBs 105. The eNBs 105 that are used for carrier aggregation may be collocated or may be connected through fast connections. In either case, coordinating the aggregation of component carriers (CCs) for wireless communications between the UE 115 and the eNBs 105 may be carried out more easily because information can be readily shared between the various cells being used to perform the carrier aggregation. When the eNBs 105 that are used for carrier aggregation are non-collocated (e.g., far apart or do not have a high-speed connection between them), then coordinating the aggregation of component carriers may involve additional aspects.

Figure 2:
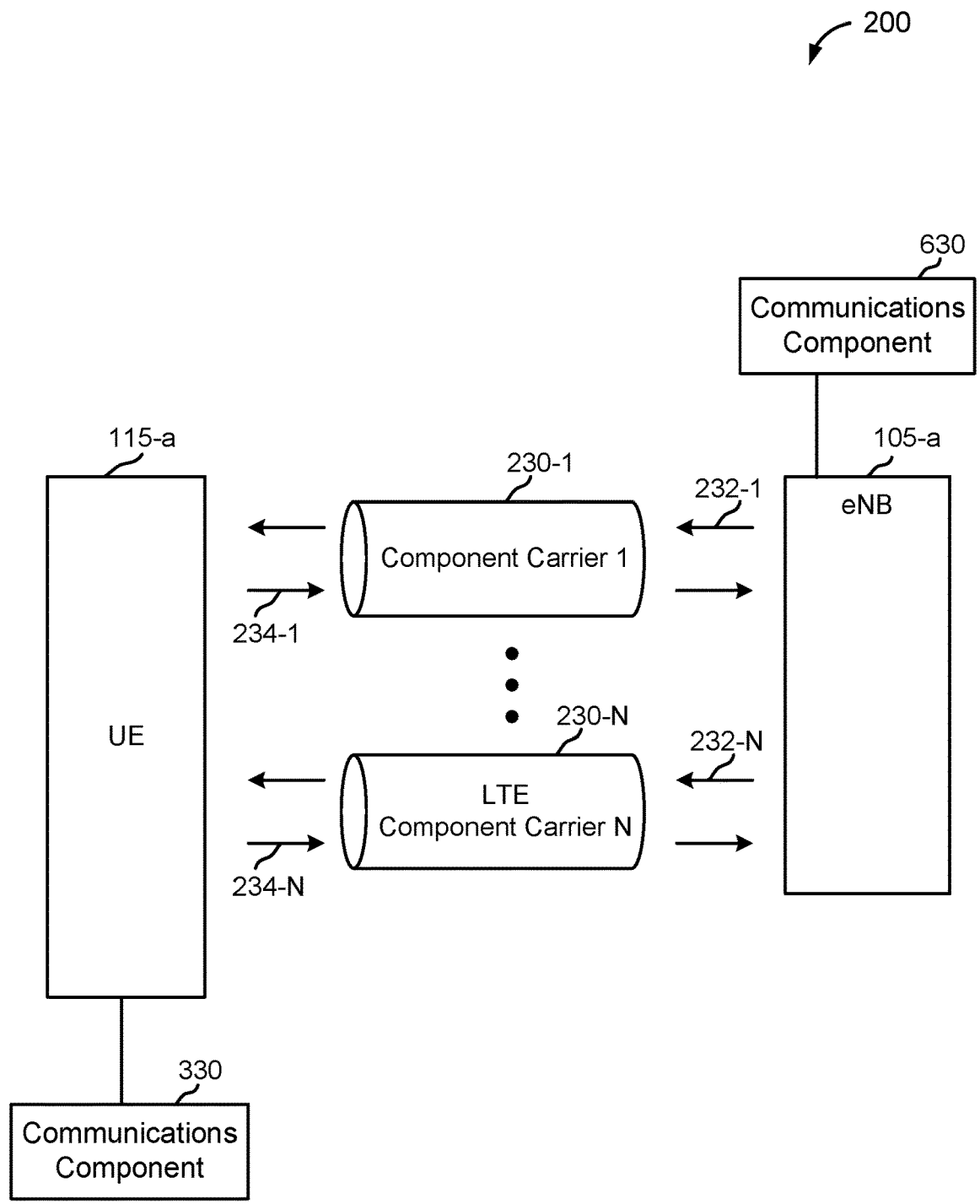
FIG. 2 is a schematic diagram conceptually illustrating carrier aggregation, in accordance with various aspects of the present disclosure.

FIG. 2 is a schematic diagram conceptually illustrating carrier aggregation, in accordance with aspects described herein. The aggregation may occur in a system 200 including an UE 115-*a* (see FIG. 1), which can communicate with an eNB 105-*a* (see FIG. 1) using one or more component carriers 1 through N ($CC_1$-$CC_N$). The eNB 105-*a* may include a communications component 630, as described herein, for performing aspects related to various schemes for DAI management in carrier aggregation, and particularly in enhanced carrier aggregation (eCA). UE 115-*a* may include a communications component 330, as described herein, for performing aspects related to various schemes for DAI management in carrier aggregation, and particularly in enhanced carrier aggregation. In this regard, the UE 115-*a* supports at least a WWAN radio access technology (e.g., LTE). While only one UE 115-*a* and an eNB 105-*a* are illustrated in FIG. 2, it will be appreciated that the system 200 can include any number of UEs 115-*a* and/or eNBs 105-*a*. In one specific example, UE 115-*a* can communicate with one eNB 105-*a* over one LTE component carrier 230 while communicating with another eNB 105-*a* over another component carrier 230.

The eNB 105-*a* can transmit information to the UE 115-*a* over forward (downlink) channels 232-1 through 232-N on LTE component carriers $CC_1$ through $CC_N$. In addition, the UE 115-*a* can transmit information to the eNB 105-*a* over reverse (uplink) channels 234-1 through 234-N on LTE component carriers $CC_1$ through $CC_N$. The number of component carriers supported by UE 115-*a* and eNB 105-*a* may be up to 32 component carriers, or more.

In describing the various entities of FIG. 2, as well as other figures associated with some of the disclosed aspects, for the purposes of explanation, the nomenclature associated with a 3GPP LTE or LTE-A wireless network may be used. However, it is to be appreciated that the system 200 can operate in other networks such as, but not limited to, an OFDMA wireless network, a CDMA network, a 3GPP2 CDMA2000 network and the like.

In multi-carrier operations, the downlink control information (DCI) messages associated with different UEs 115-*a* may be carried on multiple component carriers. For example, the DCI on a Physical Downlink Control Channel (PDCCH) may be included on the same component carrier that is configured to be used by an UE 115-*a* for Physical Downlink Shared Channel (PDSCH) transmissions (i.e., same-carrier signaling). Alternatively, or additionally, the DCI may be carried on a component carrier different from the target component carrier used for PDSCH transmissions (i.e., cross-carrier signaling). In some implementations, a carrier indicator field (CIF), which may be semi-statically enabled, may be included in some or all DCI formats to facilitate the transmission of PDCCH control signaling from a carrier other than the target carrier for PDSCH transmissions (cross-carrier signaling).

Figure 3:
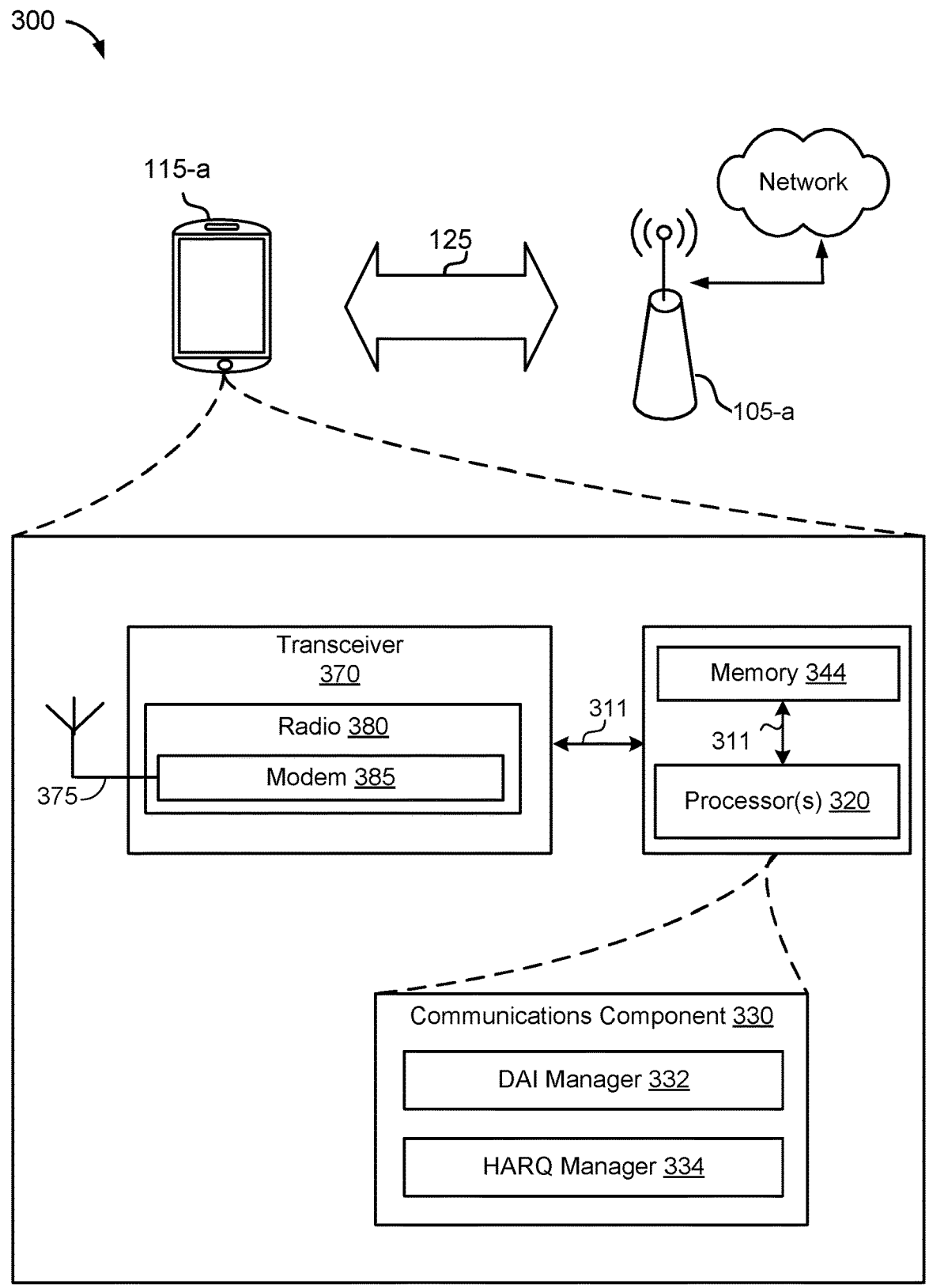
FIGS. 3 and 4 are block diagrams conceptually illustrating aspects of a UE and a DAI manager of the UE, in accordance with various aspects of the present disclosure.

FIG. 3 describes, in an aspect, a wireless communications system 300, which may represent a portion of the wireless communications system 100 in FIG. 1. The wireless communications system 300 includes at least one UE 115-*a* in communication coverage of at least one network entity, in this example, an eNB 105-*a*. UE 115-*a* may communicate with a network via the eNB 105-*a*. That is, UE 115-*a* may transmit and/or receive wireless communications to and/or from eNB 105-*a* via one or more communication links or channels 125, which may include an uplink communication channel (or simply a uplink channel or a uplink) and a downlink communication channel (or simply a downlink channel or a downlink), such as but not limited to an uplink data channel and/or a downlink data channel. Such wireless communications may include, but are not limited to, data, audio and/or video information.

Referring to FIG. 3, in accordance with the present disclosure, UE 115-*a* may include a memory 344, one or more processors 320 and a transceiver 370. The memory 344, one or more processors 320, and the transceiver 370 may communicate internally via a bus 311. In some examples, the memory 344 and the one or more processors 320 may be part of the same hardware component (e.g., may be part of a same board, module, or integrated circuit). Alternatively, the memory 344 and the one or more processors 320 may be separate components that may act in conjunction with one another. In some aspects, the bus 311 may be a communication system that transfers data between multiple components and subcomponents of the UE 115-*a*. In some examples, the one or more processors 320 may include any one or combination of modem processor, baseband processor, digital signal processor and/or transmit processor. Additionally or alternatively, the one or more processors 320 may include or implement the functionalities of a communications component 330 for carrying out one or more methods, procedures, or schemes described herein. The communications component 330, and each of its subcomponents, may comprise hardware, firmware, and/or software and may be configured to execute code or perform instructions stored in memory 344 (e.g., a computer-readable storage medium). The communications component 330 may include a DAI manager 332, described in more detail below with respect to FIG. 4, and an HARQ manager 334, which may be configured to manage various aspects of HARQ operations at UE 115-*a* and which may coordinate and/or cooperate with the DAI manager 332 to perform the HARQ operations.

In some examples, the UE 115-*a* may include the memory 344, such as for storing data used herein and/or local versions of applications associated with communications component 330 and/or one or more of its subcomponents being executed by the one or more processors 320. Memory 344 can include any type of computer-readable medium usable by a computer or processor 320, such as random access memory (RAM), read only memory (ROM), tapes, magnetic discs, optical discs, volatile memory, non-volatile memory, and any combination thereof. In an aspect, for example, memory 344 may be a computer-readable storage medium (e.g., a non-transitory medium) that stores one or more computer-executable codes defining communications component 330 and/or one or more of its subcomponents, and/or data associated therewith, when UE 115-*a* is operating processor 320 to execute communications component 330 and/or one or more of its subcomponents. In some examples, the UE 115-*a* may further include the transceiver 370 for transmitting and/or receiving one or more data and control signals to/from the network via eNB 105-*a*. The transceiver 370 may comprise hardware, firmware, and/or software and may be configured to execute code or perform instructions stored in a memory (e.g., a computer-readable storage medium). The transceiver 370 may include a radio 380 (e.g., a LTE radio) comprising a modem 385. The radio 380 may utilize one or more antennas 375 for transmitting signals to and receiving signals from eNB 105-*a*.

In general, radio 380 may support orthogonal frequency division multiplexing (OFDM) on the downlink and single-carrier frequency division multiplexing (SC-FDM) on the uplink for LTE operations. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

As described above, LTE may also use carrier aggregation, including enhanced carrier aggregation. UEs (e.g., LTE-Advanced enabled UEs) may use spectrum of up to 20 MHz bandwidth allocated in a carrier aggregation of up to a total of 100 MHz (when 5 component carriers are being used) used for transmission and/or reception. For enhanced carrier aggregation (eCA), however, the number of component carriers that may be supported is up to 32. For the LTE-Advanced enabled wireless communication systems, two types of carrier aggregation (CA) methods have been proposed, continuous CA and non-continuous CA. Continuous CA occurs when multiple available component carriers are adjacent to each other. On the other hand, non-continuous CA occurs when multiple non-adjacent available component carriers are separated along the frequency band. Both non-continuous and continuous CA may aggregate multiple component carriers to serve a single unit of LTE-Advanced UEs.

Figure 4:
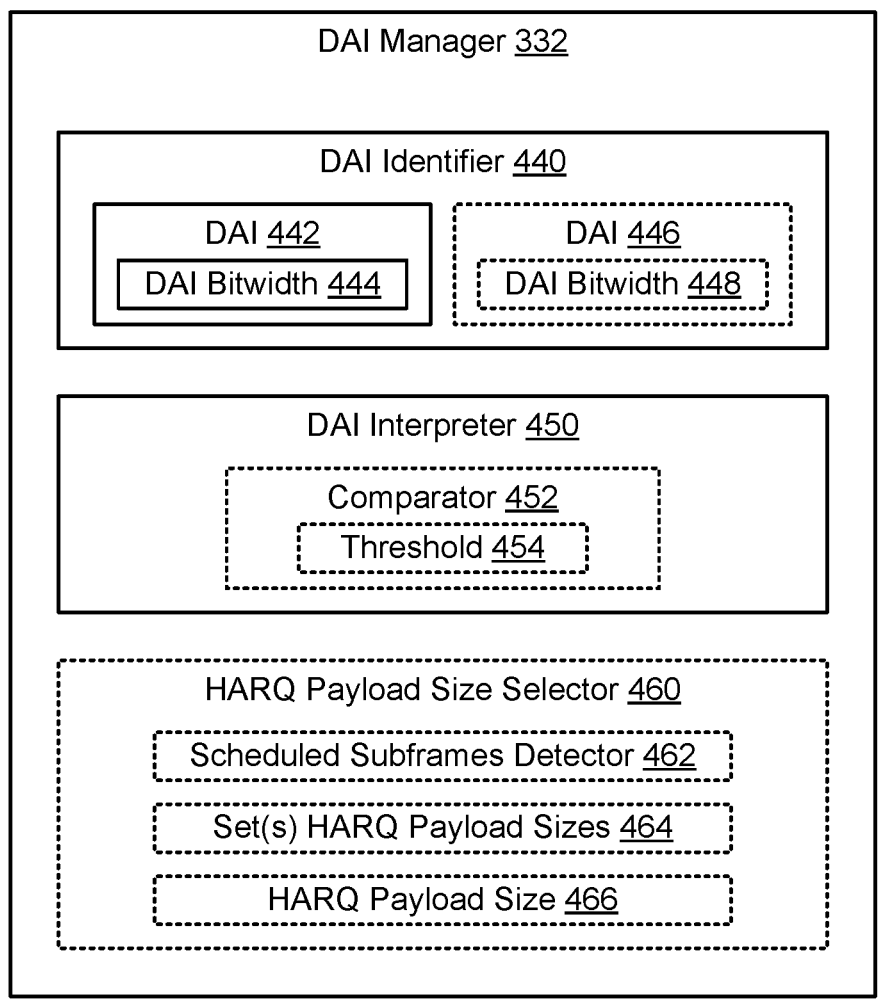

FIG. 4 is block diagram conceptually illustrating aspects of the DAI manager 332 in FIG. 3. The DAI manager 332 supports various schemes or mechanisms described below to enable the use or management of DAI in enhanced carrier aggregation operations.

In one implementation, different DAI interpretations or bitwidths may be used in DL and UL grants. For example, when a total DAI is introduced in a DL grant, different interpretations may be used for the total DAI provided in the DL grant than for a total DAI provided in the UL grant. A total DAI in a DL grant may indicate a number of downlink assignments or codewords which may be over both a frequency and a time (e.g., two-dimensional counting). Additionally, the bitwidth of such total DAI may be at least 2 bits. In an additional or alternate implementation, a total DAI in UL grants need not be interpreted much differently from how it is currently interpreted. For example, in carrier aggregation with only frequency division duplex (FDD) carriers, a total DAI in UL grants is not introduced. That is, the total DAI is not indicated in the UL grant. In carrier aggregation with time division duplex (TDD) carriers, the DAI may indicate time-domain assignments and there may not be a change in the bitwidth for the DAI in the UL grant. That is, the number of bits that is currently used may be used. In other words, the DAI may indicate how many subframes have been scheduled, but not a number or count of how many assignments over different component carriers in a subframe. In carrier aggregation with FDD and TDD carriers, a 2-bit DAI may be defined (similarly to the case of TDD with carrier aggregation) when a TDD carrier is used as a Physical Uplink Control Channel (PUCCH) cell or the DAI is not indicated when a TDD carrier is used as the PUCCH.

In another implementation, there may be different DAI interpretations depending on the number of configured component carriers (CCs) or configured ACK/NACK payload size. For example, the DAI bitwidth may be interpreted differently for different numbers of configured CCs. When the number of configured CCs is small (e.g., less than a threshold), the DAI may indicate the number of scheduled codewords. When the number of configured CCs is large (e.g., greater than or equal to the threshold), the DAI may indicate the number of scheduled CCs and/or subframes. In some cases, the threshold may be about 8 CCs. In another example, the same DAI bitwidth may be used regardless of the number of configured CCs. The different DAI interpretations may take into consideration whether a CC is a single-input-multiple-output (SIMO) (e.g., 1 bit) or multiple-input-multiple-output (MIMO) (e.g., 2 bits). For example, in an aspect, when the DAI bitwidth is 3, and the number of configured CCs is less than 8, the DAI may be interpreted to indicate the number of scheduled codewords. If the number of configured CCs is 8 or more, the DAI may be interpreted to indicate the number of scheduled CCs/subframes.

In yet another implementation, the DAI bitwidth may depend on at least two of the number of configured CCs, the transmission modes configured for the CCs, and the downlink association set size of each CC (e.g., number of DL subframes associated with an UL subframe for HARQ feedback). Generally, the DAI bitwidth may be dependent on the total HARQ payload size. For example, in some aspects, when the payload size is 22 bits or less, the DAI bitwidth may be 2 bits. When the payload size is 23-48 bits, the DAI bitwidth may be 3 bits; when the payload size is 49-96 bits, the DAI bitwidth may be 4 bits; and when the payload size is greater than 96 bits, the DAI bitwidth may be 5 bits. In an additional or optional aspect, the DAI bitwidth may depend on the PUCCH format. For example, if PUCCH format 4 (e.g., high capacity for HARQ) is configured for the UE, then a 3-bit DAI may be assumed. If PUCCH format 5 (e.g., low capacity for HARQ) is configured for the UE, then a 2-bit DAI may be assumed.

Figure 5:
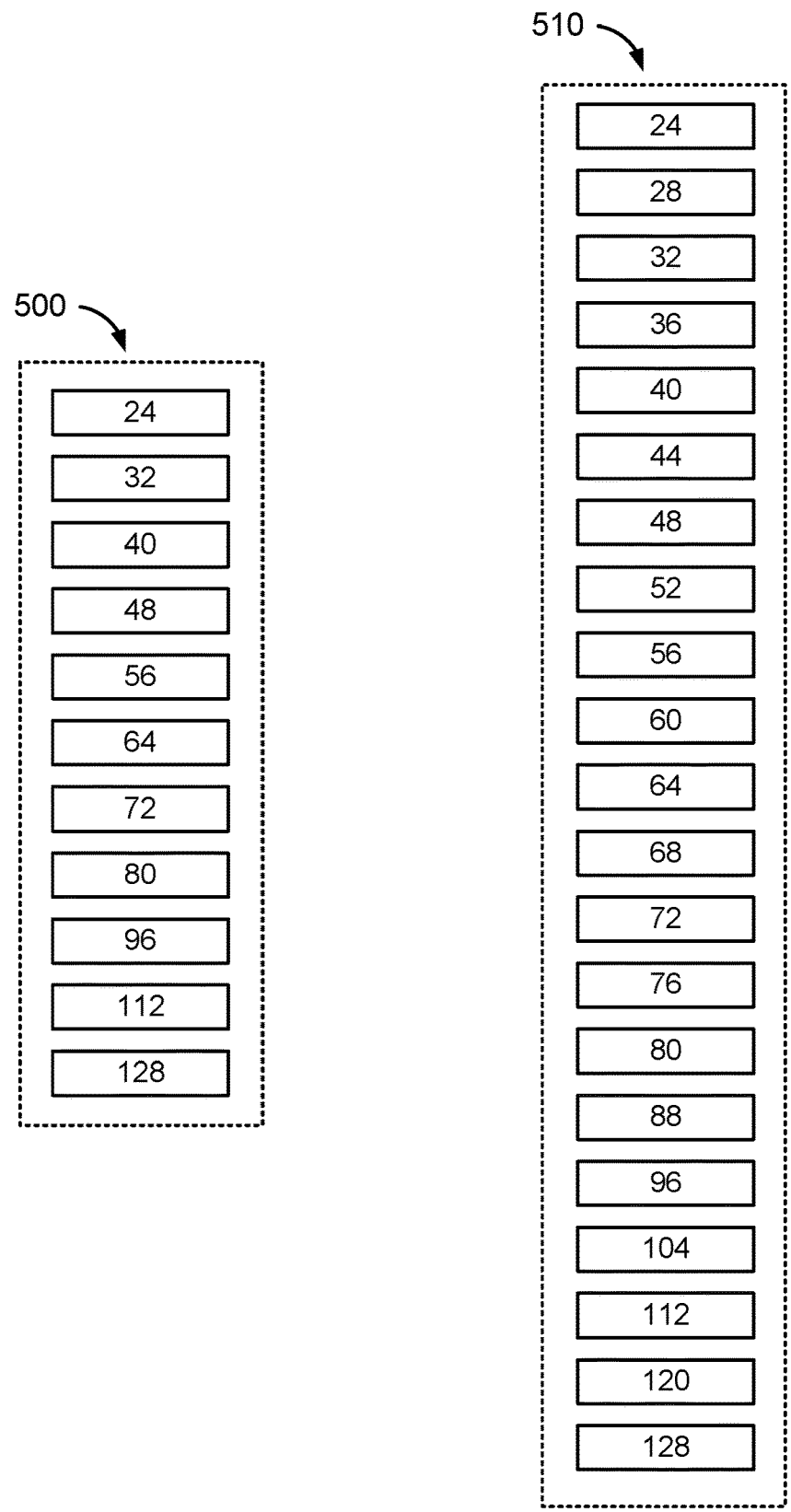
FIG. 5 is a schematic diagram conceptually illustrating sets or tables used for HARQ payload size selection, in accordance with various aspects of the present disclosure.

In yet another scheme or mechanism, the HARQ payload size granularity used for HARQ feedback may depend on whether total DAI is present. That is, when there is no total DAI in a DL grant and there is no UL grant (hence no total DAI from UL grants), a UE may determine the HARQ payload size based on comparing detected scheduled subframes (N_HARQ) to a first set of HARQ payload sizes (see e.g., set 500 corresponding to a first table of HARQ payload sizes in FIG. 5). For example, when N_HARQ is 41, the UE may determine, from set 500, that the HARQ payload size is 48 because that is the minimum granularity or entry in the table of set 500 that is not less than 41. Accordingly, the UE may select an HARQ payload size of 48 to provide HARQ feedback, even though 7 bits may go unused. However, when there is total DAI from UL grants or a total DAI from DL grants, a different set or table may be used (see e.g., set 510 corresponding to a second table of HARQ payload sizes in FIG. 5). In this case, if the 2-bit DAI from the UL grant indicates a value of 01, it may mean that HARQ payload sizes of 28, 44, 60, 76, or 104 may be used. Because the UE has detected N_HARQ to be 41, the UE may determine that HARQ payload size to be 44 because that is the minimum granularity or entry in the table of set 510 that is not less than 41. By using, in this example a table or set of HARQ payload sizes with more granularity, a saving of 4 bits may be possible.

The DAI manager 332 may be configured to support each of the schemes or mechanisms described above and further detailed below. It is to be understood that these schemes or mechanisms may be implemented independent from each other, two or more of these schemes or mechanisms may be implemented together, and/or aspects from two or more of these schemes or mechanisms may be combined. In this regard, the DAI manager 332 may include a DAI identifier 440 and a DAI interpreter 450. The DAI manager 332 may also include, optionally, a HARQ payload size selector 460. In some instances, aspects of the HARQ payload size selector 460 may be implemented, at least partially, in the HARQ manager 334 shown in FIG. 3.

The DAI identifier 440 may be configured to identify a first DAI 442 having a DAI bitwidth 444. The first DAI 442 may be a total DAI. The first DAI 442 may be received via a downlink grant from, for example, an eNB 105-*a*. The DAI identifier 440 may be configured to optionally identify a second DAI 446 having a DAI bitwidth 448. The second DAI 446 may be a total DAI. The second DAI 446 may be received via an uplink grant from, for example, an eNB 105-*a*. When the first DAI 442 and the second DAI 446 are both total DAIS, the bitwidth value of the first DAI 442 may be different from the bitwidth value of the second DAI 446.

The DAI interpreter 450 may be configured to implement various aspects of the interpretations and/or definitions described herein for DAI management in enhanced carrier aggregation. In one aspect, the DAI interpreter 450 may optionally include a comparator 452 configured to compare a number of configured CCs with a threshold 454 to determine whether the DAI indicates a number of scheduled codewords or instead indicates a number of scheduled component carriers and/or subframes.

The HARQ payload size selector 460 may be configured to detect scheduled frames (N_HARQ) using a scheduled subframes detector 462, identify a set of HARQ payload sizes from multiple sets of HARQ payload sizes 464 (see e.g., sets 500 and 510 in FIG. 5), and select a HARQ payload size 466 from the identified set based on the detected scheduled frames. It is to be understood that the sets or tables shown in FIG. 5 corresponding to HARQ payload sizes are provided by way of illustration and not of limitation.

Figure 6:
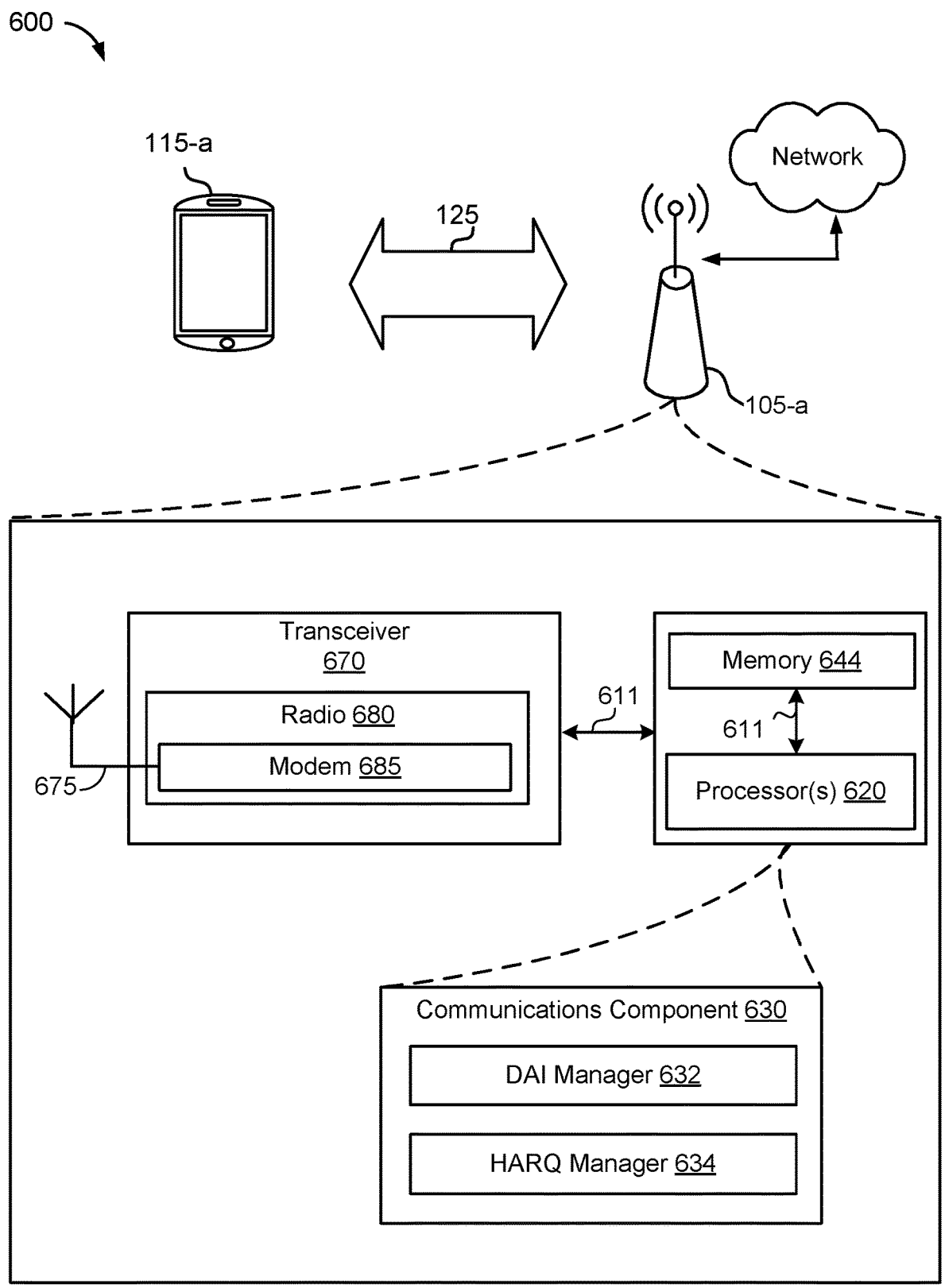
FIGS. 6 and 7 are block diagrams conceptually illustrating aspects of an eNB and a DAI manager of the eNB, in accordance with various aspects of the present disclosure.

FIG. 6 describes, in an aspect, a wireless communications system 600, which may represent a portion of the wireless communications system 100 in FIG. 1. The wireless communications system 600 includes at least one UE 115-*a* in communication coverage of at least one network entity, in this example, an eNB 105-*a*. UE 115-*a* may communicate with a network via the eNB 105-*a*. That is, UE 115-*a* may transmit and/or receive wireless communication to and/or from eNB 105-*a* via one or more communication links or channels 125, which may include an uplink communication channel (or simply uplink channel) and a downlink communication channel (or simply downlink channel), such as but not limited to an uplink data channel and/or downlink data channel. Such wireless communications may include, but are not limited to, data, audio and/or video information.

Referring to FIG. 6, in accordance with the present disclosure, eNB 105-a may include a memory 644, one or more processors 620 and a transceiver 670. The memory 644, one or more processors 620, and the transceiver 670 may communicate internally via a bus 611. In some examples, the memory 644 and the one or more processors 620 may be part of the same hardware component (e.g., may be part of a same board, module, or integrated circuit). Alternatively, the memory 644 and the one or more processors 620 may be separate components that may act in conjunction with one another. In some aspects, the bus 611 may be a communication system that transfers data between multiple components and subcomponents of the eNB 105-a. In some examples, the one or more processors 620 may include any one or combination of modem processor, baseband processor, digital signal processor and/or transmit processor. Additionally or alternatively, the one or more processors 620 may include or implement the functionalities of a communications component 630 for carrying out one or more methods, procedures, or schemes described herein. The communications component 630, and each of its subcomponents, may comprise hardware, firmware, and/or software and may be configured to execute code or perform instructions stored in a memory (e.g., a computer-readable storage medium). The communications component 630 may include a DAI manager 632, described in more detail below with respect to FIG. 7, and a HARQ manager 634, which may be configured to manage various aspects of HARQ operations in eNB 105-a and which may coordinate and/or cooperate with the DAI manager 632 to perform the HARQ operations.

In some examples, the eNB 105-a may include the memory 644, such as for storing data used herein and/or local versions of applications associated with communications component 630 and/or one or more of its subcomponents being executed by the one or more processors 620. Memory 644 can include any type of computer-readable medium usable by a computer or processor 620, such as random access memory (RAM), read only memory (ROM), tapes, magnetic discs, optical discs, volatile memory, non-volatile memory, and any combination thereof. In an aspect, for example, memory 644 may be a computer-readable storage medium (e.g., a non-transitory medium) that stores one or more computer-executable codes defining communications component 630 and/or one or more of its subcomponents, and/or data associated therewith, when eNB 105-a is operating processor 620 to execute communications component 630 and/or one or more of its subcomponents. In some examples, the eNB 105-a may further include the transceiver 670 for transmitting and/or receiving one or more data and control signals to/from the network via UE 115-a. The transceiver 670 may comprise hardware, firmware, and/or software and may be configured to execute code or perform instructions stored in a memory (e.g., a computer-readable storage medium). The transceiver 670 may include a radio 680 (e.g., LTE radio) comprising a modem 685. The radio 680 may utilize one or more antennas 675 for transmitting signals to and receiving signals from UE 115-a. The radio 680 and the modem 685 may provide substantially the same functionality as the radio 380 and the modem 385 described above with respect to FIG. 3.

Figure 7:
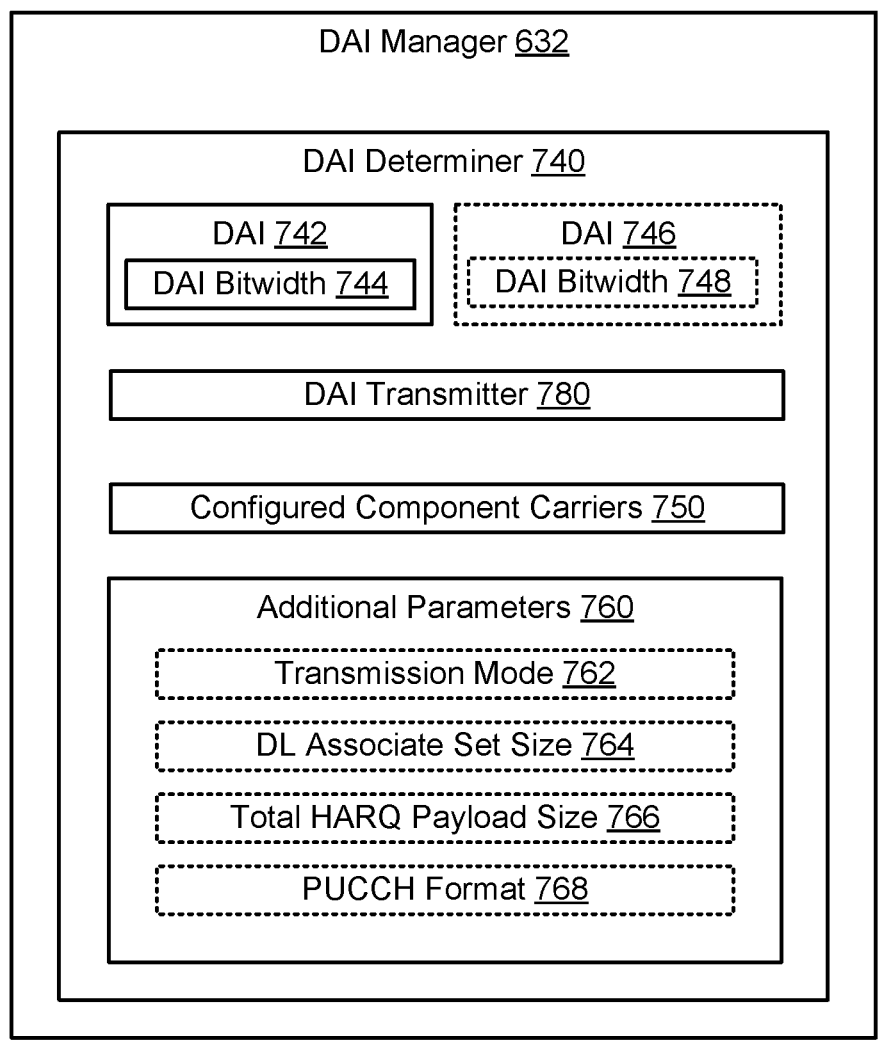

FIG. 7 is block diagram conceptually illustrating aspects of the DAI manager 632 in FIG. 7. The DAI manager 632 may support the various schemes or mechanisms described herein to enable the use or management of DAI in enhanced carrier aggregation operations. The DAI manager 632 may include a DAI determiner 740 configured to determine one or more DAI bitwidths and/or bitwidth values for communicating DAI to a UE. In one example, the DAI determiner 740 may determine a first DAI 742 having a DAI bitwidth 744. The first DAI 742 may be a total DAI, and may be communicated to a UE (e.g., UE 115-a) via a DL grant. The DAI determiner 740 may optionally determine a second DAI 746 having a DAI bitwidth 748. The second DAI 746 may be a total DAI, and may be communicated to the UE via an UL grant. When the first DAI 742 and the second DAI 746 are both total DAIS, the bitwidth value of the first DAI 742 may be different from the bitwidth value of the second DAI 746.

In an additional aspect, the DAI determiner 740 may be further configured to determine the bitwidth of a DAI (e.g., DAI bitwidth 744 of first DAI 742 or DAI bitwidth 748 of second DAI 746) based on a number of configured component carriers (CCs) 750 and at least one of additional parameters 760. The additional parameters 760 may include, as described above, at least one of a transmission mode 762, a DL associate set size 764, a total HARQ payload size 766, or a PUCCH format 768.

Figure 8:
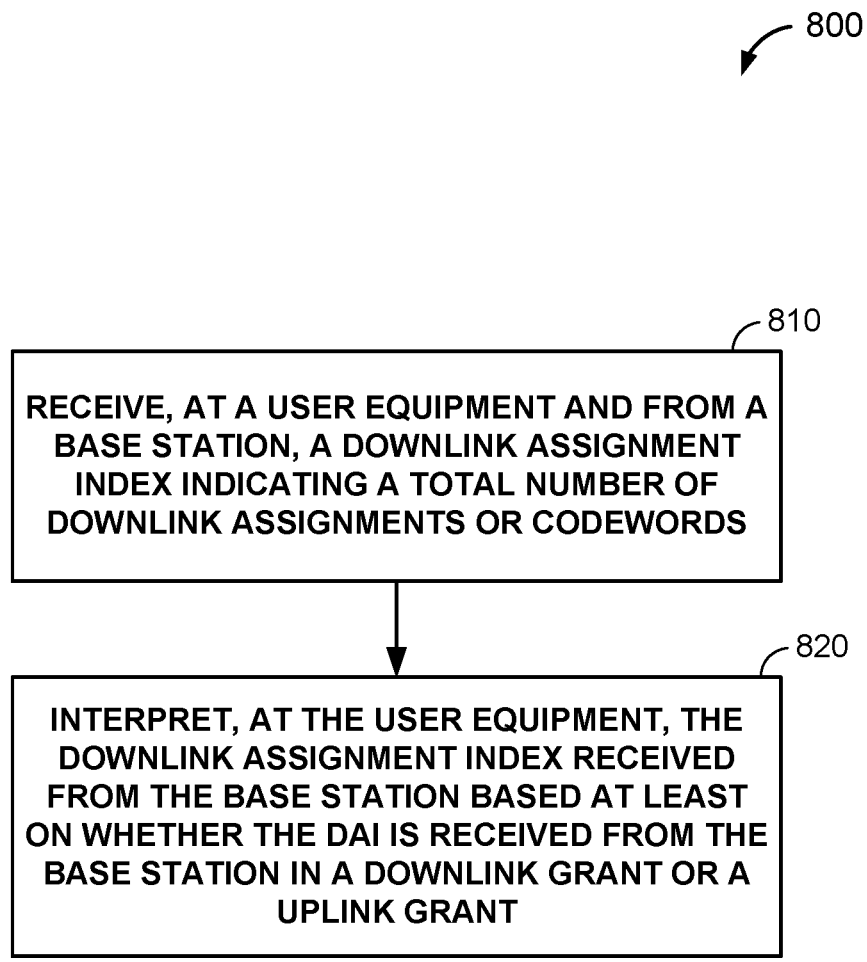
FIGS. 8 and 9 are flow diagrams conceptually illustrating examples of methods for DAI management in enhanced carrier aggregation, in accordance with various aspects of the present disclosure.
Figure 9:
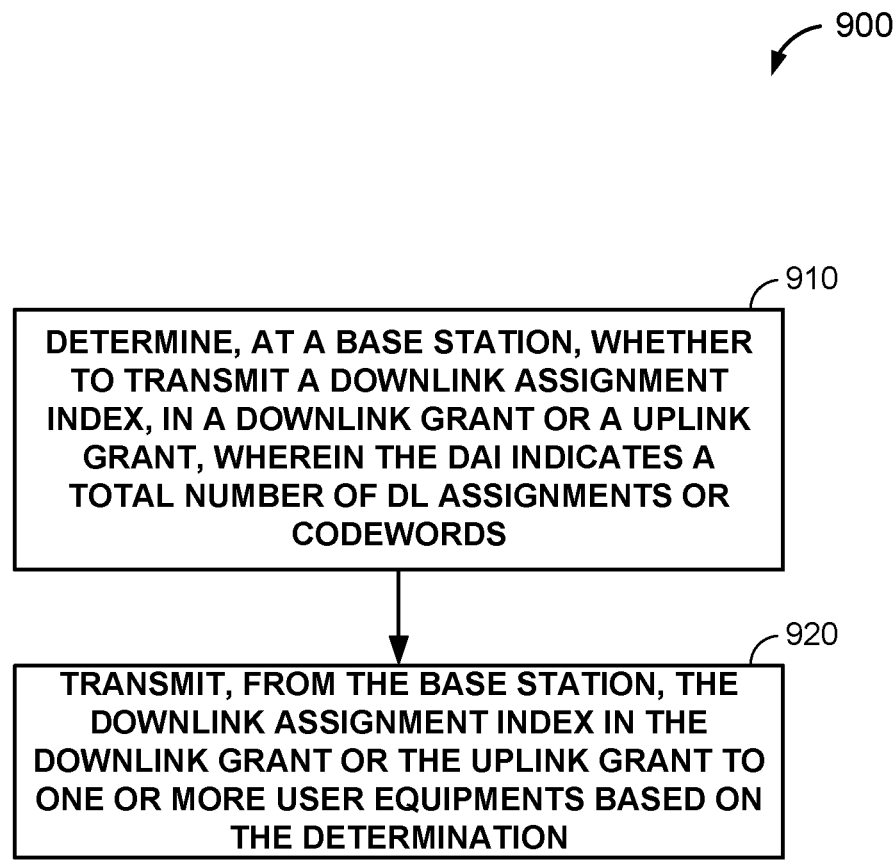

FIGS. 8 and 9 are flow diagrams conceptually illustrating examples of methods for DAI management in enhanced carrier aggregation, in accordance with various aspects of the present disclosure. Although the operations described below are presented in a particular order and/or as being performed by an example component, it should be understood that the ordering of the actions and the components performing the actions may be varied, depending on the implementation. Also, although the communications components 330 and 630 are illustrated as having a number of subcomponents, it should be understood that one or more of the illustrated subcomponents may be separate from, but in communication with, the communications components 330 and 630, and/or each other. Moreover, it should be understood that any of actions or components described below with respect to the communications components 330 and 630 and/or their subcomponents may be performed by a specially-programmed processor, a processor executing specially-programmed software or computer-readable media, or by any other combination of a hardware component and/or a software component specially configured for performing the described actions or components (see e.g., FIGS. 3-7).

Referring to FIG. 8, in an aspect, at block 810, method 800 includes receiving, at a user equipment (UE) and from a base station, a DAI indicating a total number of DL assignments or codewords. For example, in an aspect, UE 115-a and/or DAI manager 332 may include a DAI identifier 440, such as a specially programmed processor module, or a processor executing specially programmed code stored in a memory to receive, at UE 115-1 and from base station 105-1, a DAI indicating a total number of DL assignments or codewords (from base station 105-a). That is, UE 115-1 may receive DAI 442 from the base station 105-1 in the DL grant and/or or DAI 446 in the UL grant.

At block 820, method 800 includes interpreting, at the UE, the DAI received from the base station based at least on whether the DAI is received from the base station in a DL grant or a uplink (UL) grant. For example, in an aspect, UE 115-a and/or DAI manager 332 may include a DAI interpreter 450, such as a specially programmed processor module, or a processor executing specially programmed code stored in a memory to interpret, at the UE 115-a, the DAI (e.g., DAI 442 or DAI 446) received from the base station 105-*a* based at least on whether the DAI is received from the base station in the DL grant or the UL grant.

In one implementation, for example, UE 115-*a* may receive DAI 442 from base station 105-*a* in a DL grant. The DAI identifier 440 may identify that the DAI indicates a total number of DL assignments or codewords from the base station 105-*a*. The total number of DL assignments or codewords may be over both a frequency and a time (e.g., two-dimensional counting). The bitwidth 444 associated with DAI 442 may be at least two. Additionally, the presence of DAI 442 in the DL grant may be based (e.g., dependent) on at least the number of carriers in the enhanced carrier aggregation. For instance, the DAI 442 may be present in the DL grant when the number of carriers is above a threshold, for example, five. For example, the DAI 442 may be present in the DL grant when the number of carriers in the eCA is five or more. Further, DAI interpreter 450 may interpret the DAIS separately if more than one PUCCH groups are identified at the UE.

In another implementation, for example, UE 115-*a* may receive DAI 446 from base station 105-*a* in an UL grant. The DAI identifier 446 may identify that the DAI 446 indicates a total number of DAI assignments or codewords from the base station 105-*a*. The total number of DL assignments or codewords may be over a time. In an aspect, DAI 446 is not included in the UL grant when the eCA includes only FDD CCs. In an additional aspect, when the eCA includes only TDD CCs, the DAI 446 may indicate the total number of DL assignments or codewords over a time for at least one carrier of the eCA. In a further additional or optional aspect, when the eCA includes both FDD and TDD CCs, DAI 446 may be received with a DAI bitwidth 448 of two when a TDD CC is configured as a PUCCH cell. Alternately, DAI 446 is not received when a FDD CC is configured as the PUCCH cell.

Referring to FIG. 9, in an aspect, at block 910, method 900 includes determining, at a base station, whether to transmit a DAI in a DL grant or a uplink (UL) grant, wherein the DAI indicates a total number of DL assignments or codewords. For example, in an aspect, base station 105-*a* and/or DAI manager 632 may include a DAI determiner 740, such as a specially programmed processor module, or a processor executing specially programmed code stored in a memory to determine, at base station 105-*a*, whether to transmit a DAI in a DL grant or a uplink (UL) grant, wherein the DAI indicates a total number of DL assignments or codewords. For instance, when the base station 105-*a* determines to transmit the DAI in the DL grant, base station 105-*a* may transmit DAI 724 with a bitwidth 744 and/or when the base station 105-*a* determines to transmit the DAI in the UL grant, base station 105-*a* may transmit DAI 746 with a bitwidth 748.

At block 920, method 900 includes transmitting, from the base station, the DAI in the DL grant or the UL grant to one or more user equipments (UEs) based on the determination. For example, in an aspect, base station 105-*a* and/or DAI manager 632 may include a DAI transmitter 780, such as a specially programmed processor module, or a processor executing specially programmed code stored in a memory to transmit, from base station 105-*a*, DAI 742 in the DL grant and/or DAI 746 in UL grant to one or more UEs 115-*a* based on the determination. In an additional aspect, DAI manager 632 may consider one or more of a transmission mode of each of the configured CCs, a DL associate set size 764 for each of the configured CCs, a total HARQ payload size 766, and/or a PUCCH format 768 for determining and/or transmitting the DAI to the UE.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable medium embodying a method for dynamic bandwidth management for transmissions in unlicensed spectrum. Accordingly, the disclosure is not limited to the illustrated examples.

While the foregoing disclosure shows illustrative aspects, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of downlink (DL) assignment index (DAI) management in enhanced carrier aggregation (eCA), comprising:
    receiving at a user equipment (UE), from a base station, a DAI in eCA;
    determining, at the UE, the DAI indicates a total number of DL assignments or codewords;
    determining, at the UE, an interpretation of the DAI based at least on a type of grant the DAI is received in from the base station, wherein the interpretation of the DAI has a first interpretation when the DAI is in a DL grant and a second interpretation when the DAI is in an uplink (UL) grant, with the first interpretation and the second interpretation being different; and
    transmitting, from the UE, feedback to the base station based on the interpretation of the DAI,
    wherein the DAI is present in DL grant only when a number of carriers in the eCA is more than five.

2. The method of claim 1, wherein the DAI is received from the base station in the DL grant.

3. The method of claim 2, wherein the DAI indicates a total number of DL assignments or codewords over both a frequency and a time.

4. The method of claim 2, wherein a bitwidth of the DAI is at least two bits.

5. The method of claim 2, wherein a presence of the DAI in the DL grant is dependent on the number of carriers in the eCA.

6. The method of claim 2, further comprising:
    identifying a plurality of physical uplink control channel (PUCCH) groups; and
    interpreting the DAI separately for each of the plurality of PUCCH groups.

7. The method of claim 2, wherein the DAI is not included with the UL grant when the eCA includes only frequency division duplex (FDD) carriers.

8. The method of claim 1, wherein the DAI is received from the base station in the UL grant, wherein the eCA includes at least one time division duplex (TDD) carrier, and wherein the DAI indicates the total number of DL assignments or codewords over a time for at least one carrier of the eCA.

9. The method of claim 8, wherein the DAI indicates a maximum of a total number of DL assignments or codewords over a time for each respective carrier of the eCA.

10. The method of claim 1, wherein the DAI is received from the base station in the UL grant, and wherein the eCA includes both frequency division duplex (FDD) and time division duplex (TDD) carriers, and wherein the DAI is a two bit DAI in the UL grant when a TDD carrier is configured as a physical uplink control channel (PUCCH) cell.

11. An apparatus for downlink (DL) assignment index (DAI) management in enhanced carrier aggregation (eCA), comprising:
    means for receiving at a user equipment (UE), from a base station, a DAI in eCA;
    means for determining, at the UE, the DAI indicates a total number of DL assignments or codewords;
    means for determining, at the UE, an interpretation of the DAI based at least on a type of grant the DAI is received in from the base station, wherein the interpretation of the DAI has a first interpretation when the DAI is in a DL grant and a second interpretation when the DAI is in an uplink (UL) grant, with the first interpretation and the second interpretation being different; and
    means for transmitting, from the UE, feedback to the base station based on the interpretation of the DAI,
    wherein the DAI is present in DL grant only when a number of carriers in the eCA is more than five.

12. The apparatus of claim 11, wherein the DAI is received from the base station in the DL grant.

13. The apparatus of claim 12, wherein the DAI indicates a total number of DL assignments or codewords over both a frequency and a time.

14. The apparatus of claim 12, wherein a bitwidth of the DAI is at least two bits.

15. The apparatus of claim 12, wherein a presence of the DAI in the DL grant is dependent on the number of carriers in the eCA.

16. The apparatus of claim 12, further comprising:
    means for identifying a plurality of physical uplink control channel (PUCCH) groups; and
    means for interpreting the DAI separately for each of the plurality of PUCCH groups.

17. The apparatus of claim 12, wherein the DAI is not included with the UL grant when the eCA includes only frequency division duplex (FDD) carriers.

18. The apparatus of claim 11, wherein the DAI is received from the base station in the UL grant, wherein the eCA includes at least one time division duplex (TDD) carrier, and wherein the DAI indicates the total number of DL assignments or codewords over a time for at least one carrier of the eCA.

19. The apparatus of claim 18, wherein the DAI indicates a maximum of a total number of DL assignments or codewords over a time for each respective carrier of the eCA.

20. The apparatus of claim 11, wherein the DAI is received from the base station in the UL grant, and wherein the eCA includes both frequency division duplex (FDD) and time division duplex (TDD) carriers, and wherein the DAI is a two bit DAI in the UL grant when a TDD carrier is configured as a physical uplink control channel (PUCCH) cell.

21. An apparatus for downlink (DL) assignment index (DAI) management in enhanced carrier aggregation (eCA), comprising:
    a memory configured to store data; and
    one or more processors communicatively coupled with the memory, wherein the one or more processors and the memory are configured to:
        receive at a user equipment (UE), from a base station, a DAI in eCA;
        determine, at the UE, the DAI indicates a total number of DL assignments or codewords;

determine, at the UE, an interpretation of the DAI based at least on a type of grant the DAI is received in from the base station, wherein the interpretation of the DAI has a first interpretation when the DAI is in a DL grant and a second interpretation when the DAI is in an uplink (UL) grant, with the first interpretation and the second interpretation being different; and transmit, from the UE, feedback to the base station based on the interpretation of the DAI, wherein the DAI is present in DL grant only when a number of carriers in the eCA is more than five.

22. The apparatus of claim 21, wherein the one or more processors and the memory are further configured to receive the DAI from the base station in the DL grant.

23. The apparatus of claim 22, wherein the one or more processors and the memory are further configured to:
  identify a plurality of physical uplink control channel (PUCCH) groups; and
  interpret the DAI separately for each of the plurality of PUCCH groups.

24. The apparatus of claim 21, wherein the DAI is received from the base station in the UL grant, wherein the eCA includes at least one time division duplex (TDD) carrier, and wherein the DAI indicates the total number of DL assignments or codewords over a time for at least one carrier of the eCA.

25. A non-transitory computer-readable medium for downlink (DL) assignment index (DAI) management in enhanced carrier aggregation (eCA), comprising:
  code for receiving at a user equipment (UE), from a base station, a DAI in eCA;
  code for determining, at the UE, the DAI indicates a total number of DL assignments or codewords;
  code for determining, at the UE, an interpretation of the DAI based at least on a type of grant the DAI is received in from the base station, wherein the interpretation of the DAI has a first interpretation when the DAI is in a DL grant and a second interpretation when the DAI is in an uplink (UL) grant, with the first interpretation and the second interpretation being different; and
  code for transmitting, from the UE, feedback to the base station based on the interpretation of the DAI,
  wherein the DAI is present in DL grant only when a number of carriers in the eCA is more than five.

* * * * *